United States Patent [19]

Domann et al.

[11] Patent Number: 5,051,660
[45] Date of Patent: Sep. 24, 1991

[54] CIRCUIT ARRANGEMENT FOR OPERATING A GAS DISCHARGE LAMP ON A DIRECT-CURRENT SOURCE

[75] Inventors: Helmut Domann, Leonberg; Hartmann Rupp, Ludwigsburg, both of Fed. Rep. of Germany

[73] Assignee: Robert Bosch GmbH, Stuttgart, Fed. Rep. of Germany

[21] Appl. No.: 432,737
[22] PCT Filed: May 5, 1988
[86] PCT No.: PCT/DE88/00264
§ 371 Date: Oct. 27, 1989
§ 102(e) Date: Oct. 27, 1989
[87] PCT Pub. No.: WO88/09108
PCT Pub. Date: Nov. 17, 1988

[30] Foreign Application Priority Data

May 7, 1987 [DE] Fed. Rep. of Germany ....... 3715162

[51] Int. Cl.$^5$ .............................................. H05B 37/00
[52] U.S. Cl. .............................. 315/219; 315/DIG. 7
[58] Field of Search .................. 315/219, DIG. 7, 307

[56] References Cited

U.S. PATENT DOCUMENTS 4,414,493 11/1983 Henrich .......................... 315/219 X
4,477,748 10/1984 Grubbs .............................. 315/306

FOREIGN PATENT DOCUMENTS 3139340 4/1983 Fed. Rep. of Germany .

OTHER PUBLICATIONS

Siemens, Schaltbeispiel: Batteriebetriebenes 100 kHz Lampen-Vorschaltgerät mit Sipmos-Transistoren für Eine 18W Leuchtstofflampe.

Primary Examiner—Robert J. Pascal
Attorney, Agent, or Firm—Michael J. Striker

[57] ABSTRACT

A circuit arrangement is suggested for the operation of a gas-discharge lamp on a direct-current source, particularly in a motor vehicle. In order to feed the gas-discharge lamp (36) with constant power for the purpose of achieving a uniform brightness of the lamp, a push-pull inverter circuit is provided with an output power regulator (11), two transistors (12, 13) and a transformer (22) which carries out an inversion of the available fluctuating direct voltage of a direct-current source (18) into an alternating voltage of suitable level and frequency. The inverter (11, 12, 13) receives, at its control inputs, control signals which are derived from the lamp voltage (U) and the lamp current (I) for supplying the gas-discharge lamp (36) with substantially constant power in continuous operation.

17 Claims, 1 Drawing Sheet

CIRCUIT ARRANGEMENT FOR OPERATING A GAS DISCHARGE LAMP ON A DIRECT-CURRENT SOURCE

PRIOR ART

The invention is based on a circuit arrangement, for operating a gas discharge lamp on a direct-current source, as is known e.g. from DE-OS 31 39 340. This publication shows a circuit arrangement for feeding an X-ray tube which is connected with a known resonant circuit inverter via a LC series resonant circuit. In this known arrangement, the series resonant circuit is located in the primary circuit of the transformer, wherein the inductance is, formed by means of the leakage inductance of the high-voltage transformer and the lead inductance.

A wiring example for the current supply of a fluorescent lamp from a direct-current source is described in a text published by Siemens AG under stock number B1-B3192. The lamp current is not stabilized in the described preswitching device. The circuit is started by means of a special starting generator, the alternating voltage for operating the fluorescent lamp is generated by means of two SIPMOS transistors which alternately connect a primary winding of the transformer with an input direct-voltage. A RC network is connected in series with the fluorescent lamp in the secondary circuit of the transformer and provides an ignition voltage of approximately 1000 volts to the lamp by means of resonance step-up. After the firing of the lamp, the voltage at the resonant circuit capacitor breaks down to the maintaining voltage of 55 volts. The lamp current is limited by the resonant circuit choke.

ADVANTAGES OF THE INVENTION

In contrast, the circuit arrangement, according to the invention, has the advantage that, in continuous operation, a supply of the lamp is always effected with approximately constant power output. This is also true particularly with fluctuating input direct-voltage as is available e.g. in motor vehicles. The circuit arrangement, according to the invention, supplies an alternating voltage of suitable level and frequency for feeding the gas-discharge lamp with an energy which is always constant and accordingly ensures a constant brightness of the lamp. Moreover, the circuit arrangement, according to the invention, supplies the ignition voltage between 1 and 10 kV which differs depending on the lamp temperature.

Advantageous developments and improvements of the circuit arrangement provide the production of an increased heating up current after the lamp is switched on, so as to enable a quicker brightening. The maximum value of the lamp current is limited to a value which is not harmful for the electrodes of the gas-discharge lamp.

It has proven particularly advantageous that the inverter of the circuit arrangement be constructed as a push-pull inverter with transistors, whose inputs for regulating the angle of flow of opposite primary currents of the transformer are supplied with output-proportional signals corresponding to the actual values derived from the lamp current and lamp voltage. In contrast to the known circuit arrangements, it is accordingly possible to operate the lamp at constant power output and, constant brightness in a particularly simple and advantageous manner, and further also to provide the ignition voltage necessary for the hot reignition. The latter is required because there is no electrode heating, which reduces the work function of the charge carrier.

DRAWING

An embodiment example of the invention is shown in the drawing and explained in more detail in the following description.

DESCRIPTION OF THE PREFERRED EMBODIMENT

Figure 1:
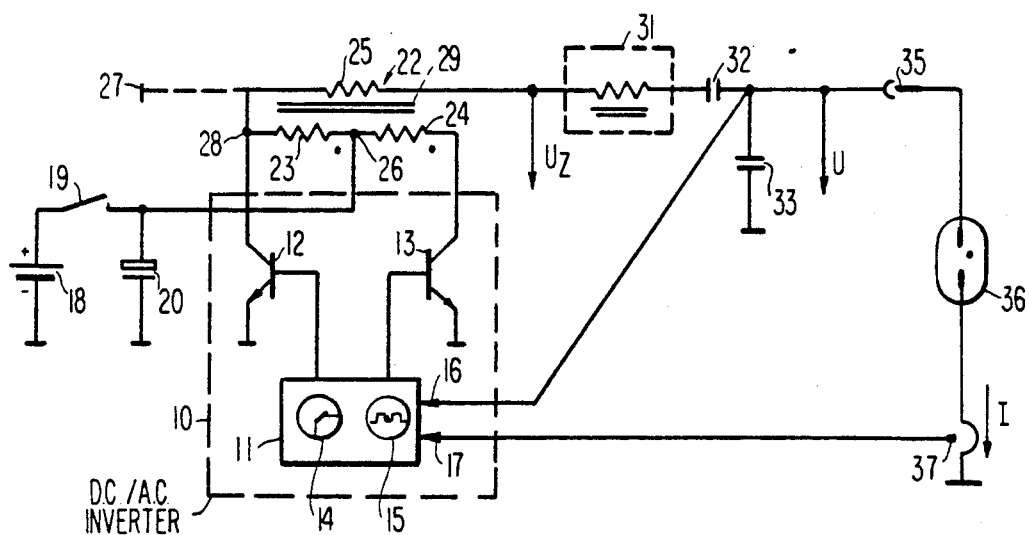
FIG. 1 shows the principle of the circuit arrangement according to the invention.

The overall construction of the DC/AC inverter is designated by 10 in FIG. 1. This inverter substantially contains a power output regulator 11 and two power transistors 12 and 13. The chief components of the power output regulator 11 are a switching device 14 for the alternating pulse-interval modulated control of the transistors 12 and 13, and a timing pulse generator 15, the switching device 14 is explained in more detail in the following description of FIG. 2. The control inputs of the power output regulator 11 are designated by 16 and 17, wherein the voltage U applied to the gas-discharge lamp is fed to the input 16 and the lamp current I is fed to the control input 17. The circuit arrangement is supplied from a direct-current source 18 via a switch 19 and a smoothing capacitor 20.

A transformer required for the step-up transformation of the feed voltage is designated by 22. It comprises a first primary winding 23 and a second primary winding 24 with the same winding direction as the first primary winding, as well as a secondary winding 25. The two primary windings 23 and 24 are connected by one end, respectively, with the collector of one of the two transistors 12 and 13; they are connected together by their other end in a junction point 26 and connected with the direct-current source 18. The secondary winding 25 is preferably connected with the ground connection 27 by one end, but it is also possible to connect this end of the secondary winding 25 in the point 28 with the primary winding 23 in the manner of an autotransformer. The core of the transformer is only designated schematically in FIG. 1 by means of a dashed line 29.

A series resonant circuit comprising a choke 31, a series capacitor 32 and a parallel capacitor 33 are connected to the secondary winding 25 of the transformer 22. Between the capacitors 32 and 33, the gas-discharge lamp 36 is connected in a connection point 35 where, the voltage U applied to the lamp is tapped for controlling the power output regulator 11. The supply circuit of the gas-discharge lamp 36 is connected to ground 27 via a current transformer 37. However, the current transformer can also be added in the connection of the gas-discharge lamp remote of the ground, which has the advantage that the gas-discharge lamp can be connected directly to motor vehicle ground without additional cables. A magnitude of the lamp current is tapped via the current transformer 37. The lamp voltage U is fed to the output regulator 11 at the control input 16, while the tapped current is fed at the control input 17.

Figure 2:
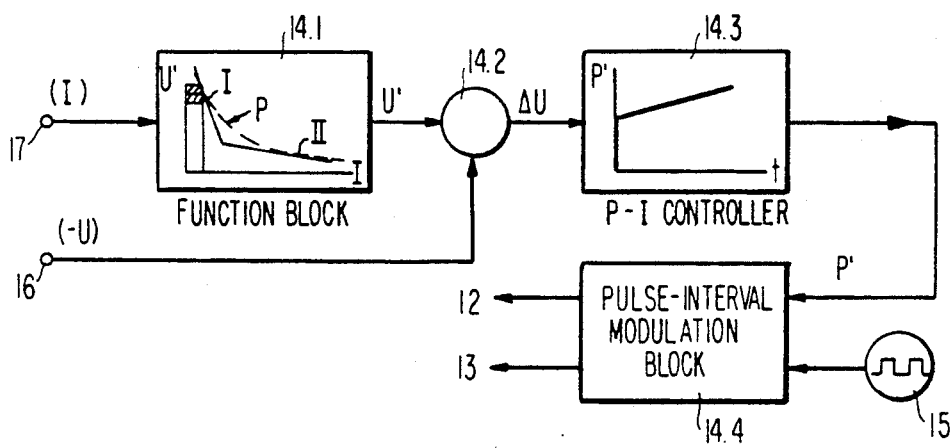
FIG. 2 shows the output regulator of the inverter.

FIG. 2 shows a block circuit diagram of the output regulator 11. A current (I) which is proportional to the lamp current I and is transformed corresponding to the turns ratio of the current transformer 37 is fed to a function block 14.1 at the control input 17. In this function block, a hyperbola corresponding to a preselected lamp power output P is approximated in the coordinate system U'/I by means of two straight lines. I and II the steeper straight line I on the left delimits the operating range of the gas-discharge lamp 36; the function values directly after the firing or ignition of the lamp during the starting process lie on the right-hand, flatter straight line II.

The voltage U' at the output of the function block 14.1 is variable corresponding to the fluctuation area indicated in the diagram in function block 14.1 and corresponds to the nominal value of the power voltage for regulating a constant lamp output of the lamp. The output voltage U' of the function block 14.1 is compared in a comparator 14.2 with the negated lamp voltage (-U) U applied at the control input 16. A differential voltage which is fed to a signal block 14.3, a proportional-integral controller in the embodiment example, results at the output of the comparator 14.2. This proportional-integral controller in turn transmits a signal P' at its output, which signal P' corresponds to the nominal value of the lamp power output and varies with the voltage differential U.

The signal P' corresponding to the nominal value of the lamp power output is fed, together with the signal of the pulse generator 15, to a pulse-interval modulation block 14.4 which alternately controls the conductive states of the two transistors 12 and 13 at a fixed frequency of the signal of generator 15 but with variable pulse intervals modulated according to the signal P' corresponding to the nominal value of the lamp power. Accordingly, the preselected constant power output for operating the lamp 36 with constant brightness is always provided via the transformer 22.

Figure 3:
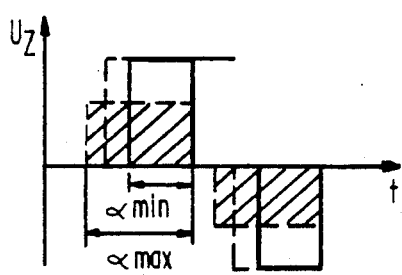
FIG. 3 shows the configuration of the voltage at the power output of the inverter.

FIG. 3 shows the configuration of the voltage $U_z$ at the output of the transformer 22. In FIG. 3, $\alpha$ min designates the minimum switch-on period of the transistors 12 and 13 and $\alpha$ max designates the greatest possible switch-on period of the transistors, wherein the time interval located in between is available for regulating the lamp output.

Figure 4:
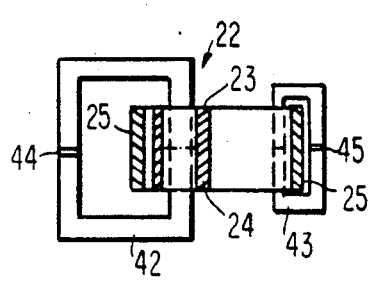
FIG. 4 shows the construction of the transformer.

FIG. 4 shows a modification of the transformer 22 with deliberately developed leakage inductance, so that the switching on of a separate choke 31 can be dispensed with. The transformer 22, includes two primary windings 23 and 24 arranged on a leg of a first magnet core 42, while the secondary winding 25 encloses a leg of a second magnet core 43. The first magnet core 42 comprises an air gap 44, the second magnet core 43 comprises an air gap 45. The leakage inductance of this arrangement is sufficient to replace the choke 31. The series resonant circuit is formed in this case by means of the leakage inductance of the transformer 22 in connection with the series capacitor 32 and the parallel capacitor 33. A separate winding on the transformer is not required; the additional second magnet core 43 is sufficient for producing a deliberate leakage inductance. The two primary windings 23 and 24 and the secondary winding 25 share the magnet core 42 with the respective magnetic conductivity. The second magnet core 43, with its own magnetic conductivity, is additionally assigned to the secondary winding 25, the magnetic resistance of the second magnet core 43 is accordingly connected in parallel with the magnetic resistance of the first magnet core 42. The magnetic conductivity of the two cores is cumulative. Accordingly, coil inductances which can be divided into the inductances of the two magnet cores 42 and 43 result for the secondary winding 25. The secondary winding acts like a series connection of two individual coils with the same number of windings with separate cores. The leakage inductance corresponding to the magnet core 43 serves as a resonant circuit element for producing the ignition voltage for the gas-discharge lamp 36 and simultaneously for current limiting as soon as the gas-discharge lamp operates. In so doing, the inductance corresponding to the magnet core 42 does not act as series inductance for the resonant circuit 31, 32, 33, so that the resonant frequency is not influenced by means of this. The inductances of the two primary windings 23 and 24 are equal, the inductance of the secondary winding in connection with the first magnet core 42 differs therefrom according to the second power of the winding ratio ($ü^2$). Thus, due to this modified construction of the transformer 22, one less winding is necessary compared to a separate choke 31 and the overall construction of the circuit arrangement can be constructed in a more compact manner.

The control of the gas-discharge lamp 36 to constant power consumption is effected as a function of the magnitudes of lamp current I and lamp voltage U. The lamp output can thus be monitored by means of a multiplier which determines the momentary lamp power output from the product of the measured magnitudes of lamp current and lamp voltage.

The construction of the output power regulator 11 shown by means of FIG. 2 does not require a multiplier, rather it forms a nominal value for the control of the transistors 12 and 13 from one of the two input values of lamp current (I) or lamp voltage (U). In the construction according to FIG. 2, the actual value of the lamp current is fed to the function block 14.1 which exhibits, as power output controlling function, a hyperbola which is simulated in an approximate manner by two straight lines I and II. An alternating current with increased frequency is prepared at the output of the transformer 22 prior to the firing or ignition process of the gas-discharge lamp 36, and the resonant frequency of the series resonant circuit 31, 32, 33 is tuned to this increased frequency. When the lamp is cold immediately after the ignition, the gas-discharge lamp receives an increased starting current which is controlled within the range of the right-hand, flatter straight line II of the plot within the function block 14.1. The nominal lamp voltage U' is low in this range. By means of dividing the frequency of the pulse generator 15, a lamp current and a lamp voltage of lower frequency are available at the output of the transformer after the termination of the firing or ignition process in the continuous operation of the gas-discharge lamp 36, so that the choke 31 or the leakage inductance of the transformer 22 limits the lamp current I. A reference voltage U', which is fed to the comparator 14.2, corresponds to this reduced current according to the left-hand, steeper straight line I in the function block 14.1. The comparator receives the negated magnitude (-U) of the lamp actual voltage as a second input quantity and forms a differential voltage $\Delta$U from it which corresponds to the deviation of the actual lamp power output from its nominal value. The nominal value P' of the lamp output is the command variable of the power output regulator 11. It is formed in the signal block 14.3 according to the magnitude of U and then fed from the signal block 14.3 to the PIM (pulse interval modulator block 14.4 which controls the two transistors 12 and 13. The signal block 14.3 operates by proportional integration.

In principle, the function block 14.1 can also be provided in the voltage branch; the same regulation can realized by means of this.

In the it circuit of FIG. 2, according to the plot in the function block 14.1, the nominal lamp output P corresponds to the product of the nominal value of the voltage regulating U' and the actual value of the lamp current I. The area in which the maintaining or operating voltage of the gas-discharge lamp lies in the normal case is shown in hatching inside the plot in the function block 14.1.

The circuit arrangement, according to the invention, is excellently suited for feeding a gas-discharge lamp 36 with constant energy, i.e. for operation with constant brightness, although the voltage of the feeding direct-current source 18 is subject to fluctuations to a considerable extent. This case can occur particularly when using the circuit arrangement in motor vehicles, where the feed voltage is exposed to considerable fluctuations due to charging and discharging cycles. This state of affairs is shown schematically in FIG. 3. The switch-on period of the transistors 12 and 13 can fluctuate in the α min and α max range; however, the feed voltage U of the gas-discharge lamp 36 also fluctuates due to fluctuations of the supply voltage. The view in FIG. 3 is intended to show that the integral of the area defined by time t and the feed voltage U of the gas-discharge lamp is kept constant by means of regulating the switch-on period of the transistors 12 and 13, wherein, depending on the level of the supply voltage and the fluctuations at the output of the transformer 22 caused by the latter, the switch-on period of the transistors 12 and 13 changes and the voltage time integral is accordingly kept constant.

The supply of the gas-discharge lamp 36 with constant power is effected in a particularly simple and operationally reliable manner with the electronic circuit arrangement according to the invention. The supply voltage available at the direct-current source 18, with a rated value of e.g. 12 or 24 volts, is transformed into an alternating voltage of suitable level and frequency. The pulse frequency supplied by the pulse generator 15 is tuned to the resonant frequency of the series resonant circuit 31, 32, 33 and accordingly allows the supply of the gas-discharge lamp 36 with an ignition voltage with peak values of 1 to 8 kV, also with 10 kV or still higher values in xenon lamps. An alternating voltage with lower frequency is provided for the continuous operation of the gas-discharge lamp 36 by means of frequency division, so that the choke 31 or the leakage inductance of the transformer 22 act as current limiting means with reduced reactive inductance. A commonly used gas-discharge lamp 36 has an output of 35 watts at a maintaining voltage of approximately 100 volts, which corresponds to a lamp current of 0.35 amperes. The circuit arrangement, according to the invention, also compensates for differences in the lamp maintaining voltage caused by manufacturing, since regulation is also effected in this instance at the preselected supply output of the gas-discharge lamp 36.

In the circuit arrangement shown in FIG. 1, one end of the secondary winding 25 of the transformer 22 is connected to ground 27 or with a connection 28 at the primary winding 23, if desired. In the latter case, copper can be economized on in the transformer 22 because the number of turns of the primary winding 23 is also used for forming the secondary winding 25 in the manner of an autotransformer. Of course, the disadvantage that the circuit arrangement is not safeguarded against short circuiting, since the secondary circuit of the transformer and the lamp supply are permanently connected with the direct-current source 18, must be taken into account. A precondition for the saver circuit is that the primary winding 23 and the secondary winding 25 have the same winding direction.

Gas-discharge lamps 36 suitable for use in motor vehicles work with an operating frequency of 9300 Hz, the ignition frequency, and accordingly also the necessary timing pulse frequency of the pulse generator 15, is six times higher. The transistors 12 and 13 are controlled at the higher pulse frequency for the purpose of firing igniting in order to achieve the greatest possible voltage step-up for the firing of the gas-discharge lamp 36, since the resonant frequency of the following resonant circuit 31, 32, 33 is reached in this case. The voltage at the capacitor 33 corresponds to the voltage at the gas-discharge lamp 36 and suffices to fire ignite the latter in both the cold and hot state. The capacitors C1 and C2 are dimensioned in such a way that the resonant frequency of the resonant circuit is substantially determined by means of the capacitance of the capacitor 33. In the embodiment example, the parallel capacitor 33 has a capacitance of 1.25 nF, the series capacitor 32 has a capacitance of 68 nF. In addition, the dimensioning of the capacitors 32 and 33 is determined in that the series capacitor 32 compensates for the choke 31 or the corresponding leakage inductance of the transformer 22 to the extent that the maximum current through the gas-discharge lamp 36 is accordingly determined at a given output voltage of the transformer 22.

The output regulator 11 acts, in connection with the transistors 12 and 13, as a push-pull vibrator or DC/AC invertor and transforms the available supply voltage of the direct-current source 18 into the required alternating voltage of suitable level and frequency. It is possible that the burning or burning frequency and the ignition frequency can be at a desired ratio relative to one another in that the transistors 12 and 13 can be controlled virtually as desired within wide ranges. Thus, it is not necessary that the ignition frequency of the gas-discharge lamp 36 corresponding to the resonant frequency of the resonant circuit 31, 32, 33 amounts to an odd-number multiple of the burning frequency in order to achieve the best resonance step-up.

In the event that the secondary winding 25 is connected with the primary winding 23 in the manner of an autotransformer, the series capacitor 32 simultaneously also serves to keep away the direct-current components from the lamp current. This prevents the lamp electrodes from being used up on one side, as occurs with direct-current components. No direct-current components are contained in the feed current of the gas discharge lamp 36 when one end of the secondary winding 25 is connected to ground 27. In this case, the series capacitor 32 serves only to compensate for the reactance impedance.

We claim:

1. Circuit arrangement for operating a gas-discharge lamp on a direct-current source, particularly in a motor vehicle, comprising a direct-current/alternating-current inverter having control inputs and an output; a transformer connected to the inverter output to produce a stepped up supply voltage for the lamp; means for deriving control signals from the lamp voltage (U) and from the lamp current (I) and for applying the control signals to the control inputs of the inverter to supply the gas-discharge lamp with substantially constant power in continuous operation; the inventer being constructed as a push-pull inverter with control elements (12, 13) whose inputs are supplied with power-output-proportional signals generated in a power regulator for regulating the angle of flow of opposite primary current of the transformer (22) according to the actual values of the lamp current (I) and lamp voltage (U); the inputs of the control elements (12, 13) of the inverter being fed with pulses of constant frequency and variable width; the power generator including a pulse generator (15), which supplies timing pulses for igniting the gas-discharge lamp (36) at the resonant frequency of a series resonant circuit (31, 32, 33) arranged in series with the gas-discharge lamp, wherein the ignition frequency is a multiple of the operating frequency of the gas-discharge lamp (36).

2. Circuit arrangement according to claim 1, characterized in that an increased lamp current (I) is fed to the gas-discharge lamp (36) in the hot-running phase for accelerating the brightening of the lamp.

3. Circuit arrangement according to claim 1, wherein the transformer has a primary winding (23, 24) connected to the output of the inverter and a secondary winding (25) for producing the stepped-up voltage for the lamp.

4. Circuit arrangement according to claim 3, characterized in that the series resonant circuit comprises a choke (31) and a capacitor (32) connected in series with the gas-discharge lamp (36) and another capacitor (33) connected in parallel with the gas-discharge lamp (36).

5. Circuit arrangement according to claim 4, characterized in that the two capacitors (32, 33) of the series resonant circuit (31, 32, 33) are dimensioned in such a way that the capacitor (33) connected in parallel with the gas-discharge lamp (36) substantially determines the resonant frequency of the series resonant circuit (31, 32, 33).

6. Circuit arrangement according to claim 4, characterized in that the capacitances of the two resonant circuit capacitors are dimensioned in a ratio of series capacitor (32) to parallel capacitor (33) of 100:1 to 10:1, preferably in a ratio of 60:1 to 50:1, wherein the series capacitor (32) compensates for the resonant circuit choke (31) to the extent that the maximum lamp current required for firing the gas-discharge lamp (36) is determined at a given lamp voltage (U).

7. Circuit arrangement according to claim 4, characterized in that the choke of the series resonant circuit is a deliberately developed leakage inductance of the transformer (22).

8. Circuit arrangement according to claim 7, characterized in that the choke of the series resonant circuit is developed by means of an additional magnet core (43) of the transformer (22) without separate winding.

9. Circuit arrangement according to claim 12, wherein the transformer comprises a common core (42) and an additional core (43) whose magnetic resistance is connected in parallel with that of the common core; the primary winding (23, 24) of the transformer being wound on the common core, and the secondary winding (25) of the transformer being wound on the common core and on the additional core.

10. Circuit arrangement according to claim 3, characterized in that one end of the secondary winding (25) of the transformer (22) is connected to ground potential (27).

11. Circuit arrangement according to claim 1, characterized in that a current transformer (37) is connected in series with the gas-discharge lamp (36), the actual value of the lamp current (I) being tapped at the current transformer (37) for regulating the arrangement at constant output power.

12. Circuit arrangement according to claim 5, characterized in that a signal (P') corresponding to a nominal value of the lamp power output serves as command variable of the switching elements (12, 13) of the inverter arrangement (11, 12, 13).

13. Circuit arrangement according to claim 12, wherein the lamp power output command signal (P') of the inverter (11, 12, 13) is formed by means of a function block (14.1) which forms according to an output controlling hyperbola, a correction signal (U') from the lamp current (I) and the lamp voltage which corresponds to the deviation from the nominal value of the lamp power output.

14. Circuit arrangement according to claim 13, characterized in that the output controlling hyperbola of the function block (14.1) is simulated by means of at least one straight line (I).

15. Circuit arrangement according to claim 13, wherein the output controlling hyperbola (P) is simulated by means of two straight lines (I, II), the nominal value of the lamp power output (P') corresponding to one straight line (I), while the second straight line (II) serves to control the ignition and heating-up phases of the gas-discharge lamp (36).

16. Circuit arrangement according to claim 15, further comprising means for correcting the one straight line (I) during the continuous operation of the gas discharge lamp (36).

17. Circuit arrangement as defined in claim 1, wherein said control elements are transistors.

* * * * *